UNITED STATES PATENT OFFICE.

JOHN WARNE PHILLIPS, OF CHICAGO, ILLINOIS, ASSIGNOR TO ALLEN R. SMART, OF CHICAGO, ILLINOIS.

TREATMENT OF SEWAGE-SLUDGE AND FERTILIZER PRODUCED THEREBY.

1,284,442.   Specification of Letters Patent.   Patented Nov. 12, 1918.

No Drawing.   Application filed April 10, 1916. Serial No. 90,161.

*To all whom it may concern:*

Be it known that I, JOHN WARNE PHILLIPS, a citizen of the United States, residing at Chicago, in the county of Cook and State of Illinois, have invented a new and useful Improvement in the Treatment of Sewage-Sludge and Fertilizer Produced Thereby, of which the following is a specification.

My invention relates to the treatment of sewage, and more particularly to a process of recovering certain valuable constitutents from the solid and semi-solid portions thereof, the process being further characterized by the fact that the sewage or sludge thereof containing the said solid and semi-solid constituents is itself rendered more valuable by the treatment.

More particularly, it is the object of the present invention to facilitate the recovery of the greases or oleaginous matter in sewage, and at the same time to enhance the value of the sludge as a fertilizer. The raw material for my process consists of the sludge of sewage obtained either by simple sedimentation of the sewage or by filtration, or by a combination of these or equivalent methods, as carried out in sewage disposal and purification plants. The sludge resulting from such separation, and being more or less wet according to the method employed in its separation, will in general consist of earthy matter, nitrogenous and other organic matter, together with a wide variety of other substances, the character and amounts of which will depend upon the source of the sewage, as is obvious. Among the more valuable of these additional constituents are greases or oils, which exist in part as such and in part as insoluble metallic soaps, such as soaps of calcium and magnesium.

In the practice of my present invention the following procedure is adopted:

The sludge, freed of water to a greater or less extent, as indicated above, is treated with sulfuric acid of a strength sufficient to attack the insoluble soaps and carbonates, but not sufficient to carbonize or destroy the organic matter. The acid known on the market as "commercial" sulfuric acid is suited to these requirements. The proportion of acid used should be ample to insure the decomposition of all of the insoluble soaps and of such carbonates as are present in the sludge, and preferably should be in excess of this amount, so that at the end of the acid treatment there will remain a certain proportion of free acid in the sludge.

This excess of acid is then neutralized by adding to and throughly mixing with and incorporating in the sludge powdered phosphate rock preferably in quantity more than sufficient to neutralize the free acid. By the action of the acid the phosphate rock is in part converted into superphosphates, leaving the excess in its original form in the sludge. Accordingly, as it is desired to produce a greater or less proportion of superphosphates, a greater or less excess of sulfuric acid will be used in the original treatment, and, in like manner, the amount of phosphate rock added will be gaged by the proportion of unaltered phosphate which is desired in the final product. The phosphate rock, used in this manner as a neutralizing agent for the excess of acid, does not cause the reformation of soaps from the free fatty acids.

After the sludge has been treated by the sulfuric acid and phosphate rock, as described, the grease and oleaginous matter, including the fatty acids liberated by the decomposition of the insoluble soaps, will be extracted by any suitable solvent, such as light hydrocarbon oils, for instance, from which solvent they may be recovered by well-known methods.

Where the sludge contains too high a percentage of moisture after the sulfuric acid and phosphate rock treatment, it will preferably be partly or wholly dried prior to extraction.

The sludge after the extraction of the greases therefrom, will preferably be dried, either by an air-blast, or by any preferred means. The finished product will then form a fertilizer of the highest grade, free of grease and containing in addition to the nitrogenous and other valuable organic constituents of the sewage, a greater or less proportion of superphosphates and normal phosphate rock.

This blend of phosphates and organic and nitrogenous matter forms an approximately "balanced" fertilizer for general use, and is therefore peculiarly desirable as embodying in the one homogeneous composition substantially all of the elements required for the proper nourishment and support of plant life.

The process as outlined above is peculiarly suited to operation on a commercial scale, by reason of the fact that no nice adjustment of the proportions of chemicals used in the treatment of the sludge is required. Specimen analyses taken at relatively infrequent intervals will be sufficient to indicate the approximate percentage of carbonates and insoluble soaps which may be looked for in the sludge. Instead of attempting to nicely balance the quantity of sulfuric acid used to this figure, a safe excess may be regularly employed, the excess, whatever its proportion within moderate limits, being at all times neutralized by the subsequent addition of the phosphate rock. So also as to the amount of phosphate rock added, no regard need be had for stoichiometrical calculations, the rock, like the acid, being merely added in a safe excess.

As a variant of the above-described process, it may be mentioned that it is quite feasible to reverse the order of treatment, adding and incorporating the powdered phosphate rock with the sewage sludge prior to the addition of the acid thereto. While I prefer to adopt the procedure first named, the latter method may be desirable under some circumstances.

As evidencing the utility of the present process, it may be mentioned that the increase in value of the sludge as a fertilizer by reason of my treatment thereof will ordinarily equal or exceed the entire cost of the treatment, so that the value of the grease recovered from the treated sludge may be looked upon as a net gain.

While I have described in considerable detail a preferred process in accordance with my invention, together with one variant thereof, it is to be understood that this description is illustrative only and for the purpose of making the invention more clear, and that I do not regard the invention as limited to the detailed steps of procedure described, nor to any of them, except in so far as such limitations have been included within the terms of the following claims, in which it is my intention to claim all novelty inherent in my invention as broadly as is permissible in view of the prior art.

What I claim as new and desire to secure by Letters Patent is—

1. The process of treating the solid and semi-solid constituents of sewage which consists in adding thereto an excess of a mineral acid capable of decomposing the insoluble metal soaps present therein, neutralizing the free mineral acid by the addition of a compound which will not react with the fatty acids to form soaps, and extracting oleaginous matter by means of a solvent.

2. The process of treating the solid and semi-solid constituents of sewage which consists in adding thereto an excess of a mineral acid capable of decomposing the insoluble metal soaps present therein, neutralizing the free mineral acid by the addition of phosphate rock, and extracting oleaginous matter by means of a solvent.

3. The process of treating the solid and semi-solid constituents of sewage which consists in adding thereto an excess of sulfuric acid, neutralizing the excess of sulfuric acid by the addition of an excess of phosphate rock, and extracting oleaginous matter by means of a solvent.

JOHN WARNE PHILLIPS.

Copies of this patent may be obtained for five cents each, by addressing the "Commissioner of Patents, Washington, D. C."